United States Patent
Osborne et al.

(10) Patent No.: US 9,601,788 B2
(45) Date of Patent: Mar. 21, 2017

(54) VARYING WALL GEOMETRY EJECTOR

(71) Applicant: Ford Global Technologies, LLC, Dearborn, MI (US)

(72) Inventors: Kurt David Osborne, Dearborn, MI (US); Mark A. Pellerin, Saline, MI (US); Milos Milacic, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 555 days.

(21) Appl. No.: 13/750,175

(22) Filed: Jan. 25, 2013

(65) Prior Publication Data

US 2014/0212776 A1 Jul. 31, 2014

(51) Int. Cl.
*H01M 8/04* (2016.01)

(52) U.S. Cl.
CPC ... *H01M 8/04097* (2013.01); *H01M 8/04619* (2013.01); *H01M 8/04753* (2013.01); *Y02E 60/50* (2013.01)

(58) Field of Classification Search
CPC ......... H01M 8/04089; H01M 8/04753; H01M 8/04201
USPC ........................................................ 429/415
See application file for complete search history.

(56) References Cited

U.S. PATENT DOCUMENTS

| 6,706,438 B2 | 3/2004 | Sahoda et al. |
| 6,858,340 B2 | 2/2005 | Sugawara et al. |
| 7,105,243 B2 | 9/2006 | Morishima et al. |
| 2006/0251935 A1 | 11/2006 | Barrett et al. |
| 2007/0163649 A1 | 7/2007 | Yamagishi et al. |
| 2009/0035618 A1 | 2/2009 | Brighton et al. |
| 2009/0317691 A1 | 12/2009 | Yamada et al. |
| 2010/0209818 A1* | 8/2010 | Fukuma et al. ............ 429/513 |

FOREIGN PATENT DOCUMENTS

JP 2009252634 A 10/2009

* cited by examiner

*Primary Examiner* — Stewart Fraser
*Assistant Examiner* — Otatunji Godo
(74) *Attorney, Agent, or Firm* — Brooks Kushman P.C.; Damian Porcari (57) ABSTRACT

An apparatus for delivering a primary fuel stream to a fuel cell stack is provided. The apparatus includes an ejector that is configured to receive the primary fuel stream from a fuel supply. The apparatus is further configured to receive the recirculated fuel stream from the fuel cell stack to provide a combined fluid stream for delivery to the fuel cell stack. The ejector includes an elastic conduit for varying a flow of the combined fluid stream based on a power level of the fuel cell stack.

13 Claims, 6 Drawing Sheets

Fig-2E (12) United States Patent

VARYING WALL GEOMETRY EJECTOR

TECHNICAL FIELD

Embodiments disclosed herein generally relate to an ejector with variable geometrical features for use in connection with a fuel cell system.

BACKGROUND

It is known to use an ejector in connection with a fuel cell system. One example of such an implementation is set forth in U.S. Pat. No. 7,943,260 ("the '260 patent") to Brighton et al.

The '260 patent provides a system and method for delivering an input fluid stream through a fuel cell stack and discharge an unused fluid stream is provided. An inlet of the fuel cell stack is adapted to receive the fluid stream. An ejector is configured to combine the supply fluid stream and the unused fluid stream to generate the input fluid stream and control the flow of the input fluid stream to the fuel cell stack. A blower is configured to control the flow of the unused fluid stream to the ejector. A bypass valve is configured to control the flow of the unused fluid stream to the blower and to the ejector.

SUMMARY

An apparatus for delivering a primary fuel stream to a fuel cell stack is provided. The apparatus includes an ejector that is configured to receive the primary fuel stream from a fuel supply. The apparatus is further configured to receive the recirculated fuel stream from the fuel cell stack to provide a combined fluid stream for delivery to the fuel cell stack. The ejector includes an elastic conduit for varying a flow of the combined fluid stream based on a power level of the fuel cell stack.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is generally known that a number of fuel cells are joined together to form a fuel cell stack. Such a stack generally provides electrical current in response to electrochemically converting hydrogen and oxygen into water and energy. The electrical current is used to provide power for various electrical devices. A supply generally provides hydrogen ("supply hydrogen") to the fuel cell stack. The fuel cell stack may use less hydrogen than provided by the supply to generate electrical power. The fuel cell stack may discharge the unused hydrogen. An ejector receives the unused hydrogen discharged from the fuel cell stack and combines the unused hydrogen with the hydrogen generated from the supply to sustain a flow of hydrogen to the fuel cell stack. The ejector presents the supply hydrogen with the unused hydrogen to the fuel cell stack. The recirculation of the unused hydrogen to the fuel cell stack may improve fuel efficiency.

The amount of hydrogen that is passed through the fuel cell stack and needed to produce electrical current varies based on the levels of power consumption. In a high power mode (or level), the flow of the unused hydrogen discharged from the fuel cell stack is generally high since the fuel cell stack has to consume more hydrogen at a relatively faster rate in order to meet higher power demands. In one example, a vehicle that is powered by a fuel cell system may be the high power mode when the vehicle is operating at a high speed.

During a low power mode (or level), the flow of the unused hydrogen discharged from the fuel cell stack is generally low since the fuel cell stack consumes hydrogen at a low rate. The vehicle that is powered by the fuel cell system may be in the low power mode then vehicle is in an idle state or operating at a speed that is below a predetermined threshold.

In either the high power mode or the low power mode, it is generally desirable to provide a mixture of supply hydrogen and the recirculated unused hydrogen. The ejector as noted above combines the flow of the supply hydrogen and the unused hydrogen and enables delivery of the same to the fuel cell stack. Typical ejectors used for this passive recirculation have a fixed wall geometry which does result in a limited operating range. The fixed mixing chamber geometry can lead to choked or limited secondary or recirculated hydrogen (unused hydrogen) flow. Due to the limited operating range of one ejector, system designs may require multiple ejectors to meet a wider operating range requirement (e.g., generally a 4:1 turndown ratio). This condition may affect cost, quality and robustness. Embodiments as set forth herein may enable the use of a single ejector in a fuel cell system.

For example, a single ejector may be used in connection with a conduit that includes an elastic conduit such that the geometry of the conduit can be varied by external control. The diffuser, under this condition may allow further expansion of the operating range than that of the typical ejector. The single ejector along with the elastic conduit may replace the need for multiple fixed geometry ejectors when used in a fuel cell system.

Figure 1:
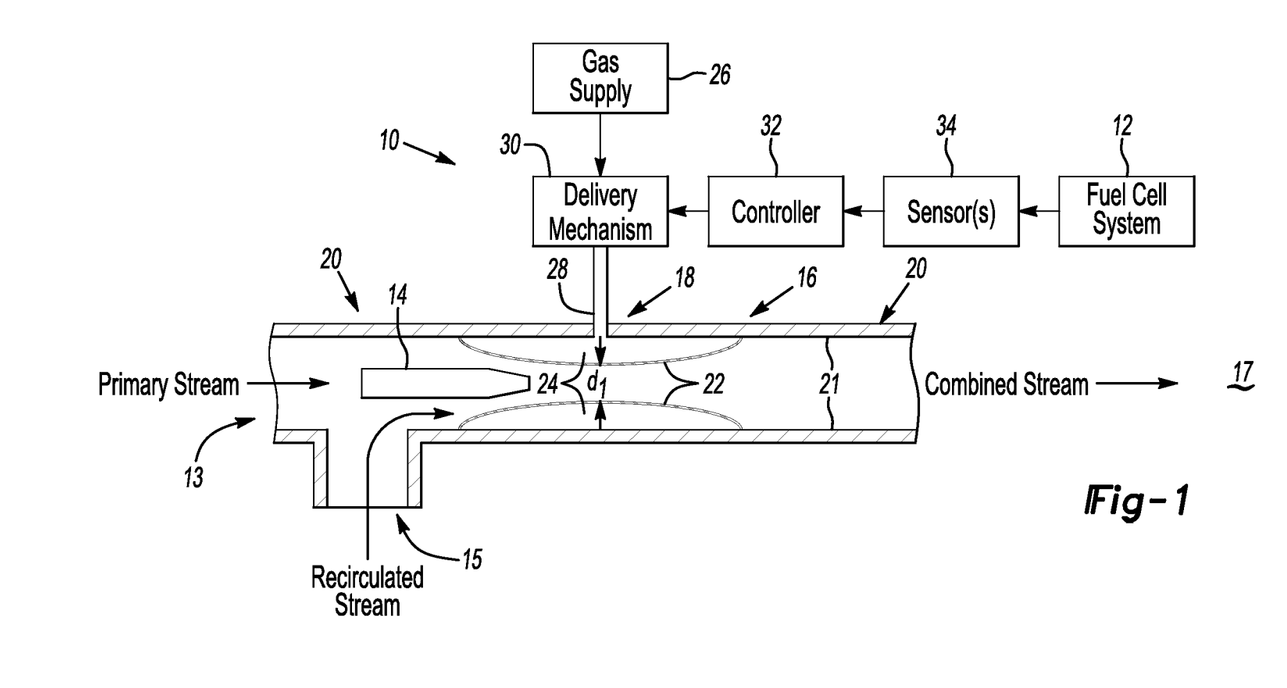
FIG. 1 depicts an apparatus for use in connection with a fuel cell system in accordance to one embodiment.

FIG. 1 depicts an apparatus 10 for use in connection with a fuel cell system 12 in accordance to one embodiment. The apparatus 10 may be used in connection with a fuel cell system 12 in a vehicle. The apparatus 10 may be an ejector or other suitable device. The apparatus 10 includes a nozzle 14 and a non-varying (or fixed) conduit 16 for providing a primary fuel stream ("primary stream") and a recirculated fuel stream ("recirculated stream") to a fuel cell stack 17 within the fuel cell system 12. A first inlet 13 of the apparatus 10 receives the primary stream from a fuel supply (or hydrogen supply). A second inlet 15 of the apparatus 10 receives the recirculated stream from the fuel cell stack 17.

A tank valve (not shown) may control the supply of the primary stream and a pressure regulator (not shown) may regulate the pressure of the primary stream. The fuel cell stack may include an outlet for delivering an unused portion of the primary stream. As noted above, the fuel cell stack may not consume the entire amount of the primary stream. Thus, the unused portion of the primary stream may be recirculated back to the fuel cell stack. This unused portion of the primary stream is generally defined as the recirculated stream. An example of the manner in which the primary stream is provided to the fuel cell stack and the manner in which the recirculated stream is generated is set forth in the '260 patent which is hereby incorporated by reference in its entirety.

The nozzle 14 directs the primary stream into the conduit 16. The primary stream upon exiting nozzle 14 co-acts with the recirculated stream for combining the same with the primary stream to provide a combined stream. The combined stream (e.g., the primary stream and the recirculated stream) is delivered to the fuel cell stack for generating power. It is generally desirable to ensure that the recirculated stream is provided along with the primary stream to the fuel cell stack to improve fuel efficiency and to provide additional humidification of a fuel stream.

The conduit 16 generally includes a first section 18 and a second section 20. The first section 18 comprises a solid wall 21 (or non-varying conduit) and a varying (or elastic) conduit 22. The elastic conduit 22 may be formed of a soft plastic or other suitable material to enable flexing thereof.

The elastic conduit 22 may be generally cylindrical and defines an inner diameter (dl) within the non-varying conduit 16 that may change based on various operating characteristics of the fuel cell system 12. This aspect will be discussed in more detail below. It is recognized that the shape of the elastic conduit 22 may take on any number of shapes or configurations and that the conduit 22 generally defines an opening and that the size of the opening may vary based on the operating characteristics of the fuel cell system 12. In the event the elastic conduit 22 is not generally cylindrical, then it is recognized that the elastic conduit 22 generally includes elastic walls which define the opening therebetween. The elastic conduit 22 is generally impermeable for preventing the combined stream from passing therethrough. The second section 20 also includes the solid wall 21 (or non-varying conduit).

The non-varying conduit 21 and the elastic conduit 22 generally define a gas chamber 24 for receiving gas from a gas supply 26. The gas may be in the form of hydrogen, air, nitrogen, etc. In general, the gas supply 26 may be the hydrogen supply that also provides the primary stream. In general, the addition of the gas within the gas chamber 24 causes the elastic conduit 22 to move inward thereby causing a decrease of the inner diameter (or opening). This condition causes a change in the geometry of the elastic conduit 22. Conversely, gas may be removed from the gas chamber 24 to cause the elastic conduit 22 to move outward thereby causing an increase of the inner diameter (or opening). This condition also causes a change in the geometry of the elastic conduit 22. The gas supply 26 may be an air supply that also provides a cathode stream to the fuel cell stack. The gas supply 26 may also be a pressurized hydrogen supply that provides an anode stream (or the primary stream) to the fuel cell stack. A gas inlet 28 is positioned within the first section 18 for providing the gas as received from the gas supply 26 to the gas chamber 24.

A gas delivery mechanism (or multi-port bi-directional electrofluidic actuator) 30 is positioned between the gas supply 26 and the gas inlet 28. In one example, the gas delivery mechanism 30 may comprise a pump or other suitable device for increasing the pressure of air in the event air is used to move the elastic conduit 22. In another example, the gas delivery mechanism 30 may comprise a valve and/or a pressure regulator to provide hydrogen in the event the hydrogen is used to move the elastic conduit 22. The gas delivery mechanism 30 may also comprise a vacuum for removing the gas from the gas chamber 24. The vacuum in this case may be used to remove the air, hydrogen, nitrogen, etc.

A controller 32 is operably coupled to the gas delivery mechanism 30 for controlling the manner in which the gas is delivered to the gas chamber 24. The controller 32 may control the amount of gas that is delivered to the gas chamber 24 based on various operating characteristics of the fuel cell system 12. One or more sensors 34 detect the operating characteristics of the fuel cell system 12 and provide signals indicative of such characteristics. For example, it may be desirable to increase the amount of gas that is delivered to the gas chamber 24 such that the inner diameter (or opening) is decreased to create a narrower flow path for the combined stream in moments in which the fuel cell system 12 is operating in the low power mode. In this case, the sensor 34 may measure the amount of current and/or power that is being generated by the fuel cell. The controller 32 may receive a signal from the sensor 34 that is indicative of the measured current and/or power and control the gas delivery mechanism 30 to provide the gas to the gas chamber 24 in the event the measure current and/or power is below a predetermined amount. In this case, the fuel cell is not generating a large amount of power or current and a large amount of hydrogen may not be needed. As such, the opening is decreased to reduce the area of the flow path. However it is still necessary to combine the hydrogen from the primary stream and the hydrogen from the recirculated stream for fuel economy purposes. While the diameter (or opening) decreases in response to the elastic conduit 22 deflecting inwards, this characteristic still enables the hydrogen from the both the primary stream and the recirculated stream to be combined and delivered to the fuel cell.

When the fuel cell system 12 is operating in the high power mode, it may be desirable to increase the diameter (or opening) of the elastic conduit 22 to allow for an increased the amount of combined flow (e.g., hydrogen within both the primary stream and the recirculated stream) in the conduit 16. In this case, the sensor 34 may transmit a signal indicative of the current and/or power being above the predetermined amount to the controller 32 such that the gas delivery mechanism 30 removes the gas within the gas chamber 24 to increase the diameter (or opening) of the elastic conduit 22. This condition enables the hydrogen from both the primary stream and the recirculated stream to be combined and delivered to the fuel cell. While power or current may be an indicator to provide or remove gas from the gas chamber 24 to cause the elastic conduit 22 to deflect inward or outward for changing the diameter (or opening), it is contemplated that other operations characteristics may be used or monitored for this purpose as well. For example, temperature of the fuel cell stack may be used to determine the amount of gas provided (or removed) from the gas chamber 24.

FIGS. 2A-2E depict various views of the apparatus 10 with the elastic conduit 22 that under varying operating conditions that restrict or enable flow of the primary stream and the recirculated stream in accordance to one embodiment.

Figure 2A:
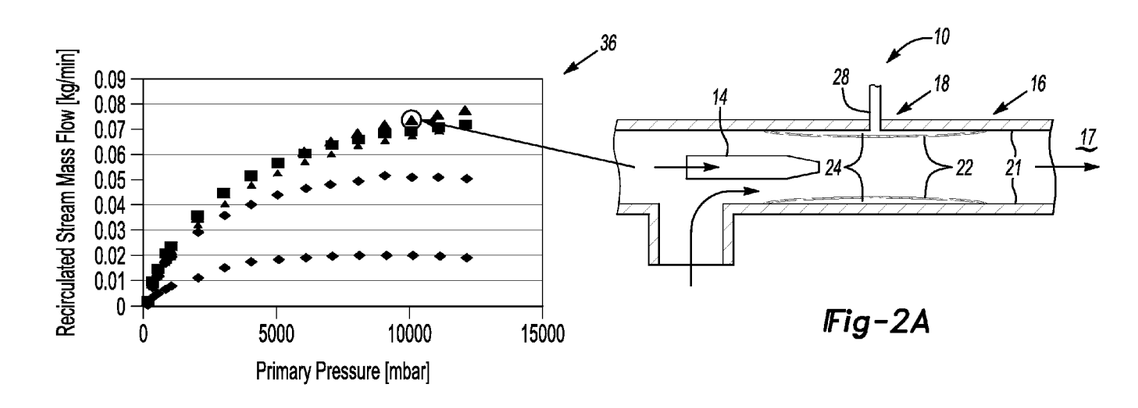
FIGS. 2A-2E depict various views of the apparatus with an elastic conduit under various operating conditions that restricts or enables flow of a primary stream and a recirculated stream in accordance to one embodiment.
Figure 2B:
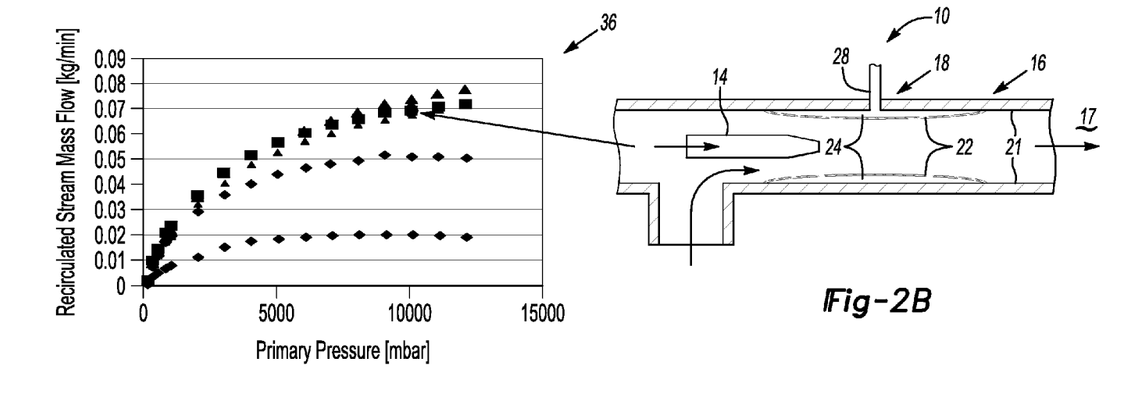
Figure 2C:
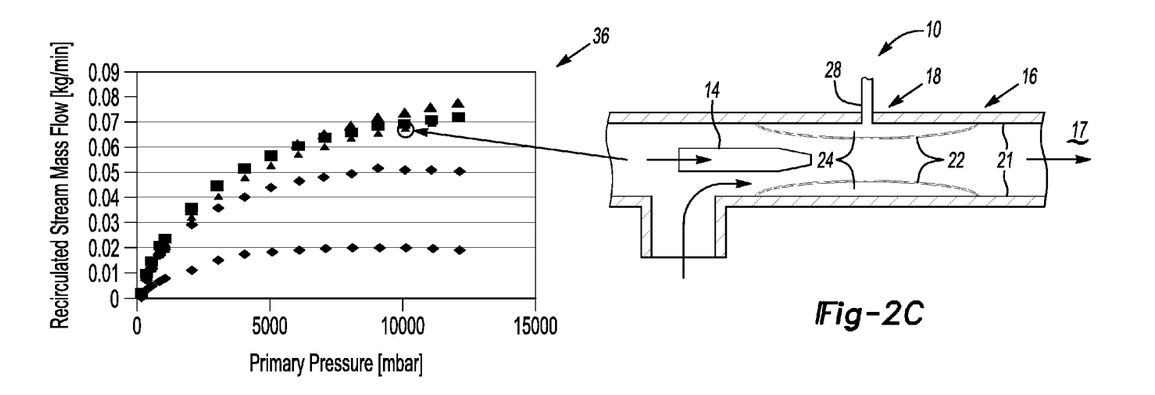
Figure 2D:
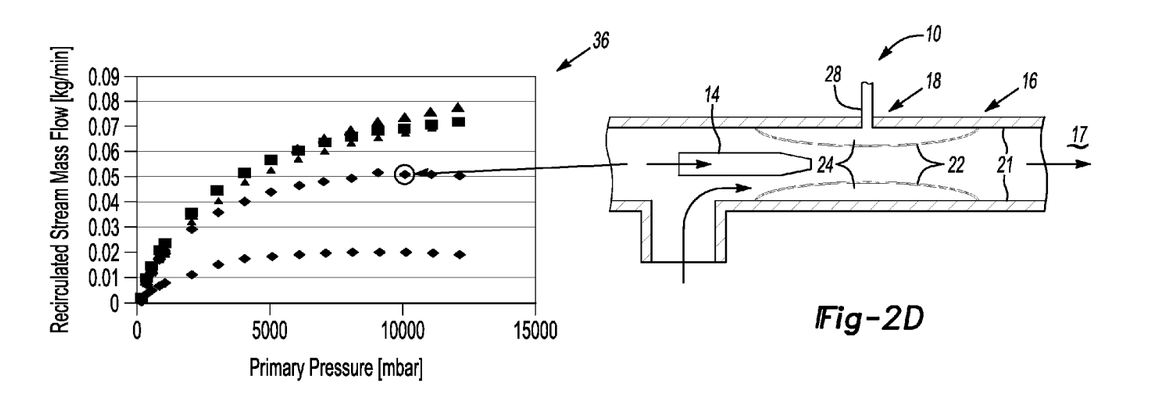

FIG. 2A depicts the inner diameter (or opening) of the elastic conduit 22 in a maximum open state. In other words, there is not enough gas in the gas chamber 24 to cause the elastic conduit 22 to deflect. This condition may be indicative of the fuel cell system 12 being in the high mode to enable maximum flow of the primary stream and the recirculated stream to the fuel cell stack. FIG. 2A provides a plot 36 depicting the pressure of the primary stream on the x-axis and the mass flow of the recirculated stream on the y-axis. As shown in the plot 36, the pressure of the primary stream and the mass flow of the recirculated stream are at maximum values in this state.

Figure 2E:
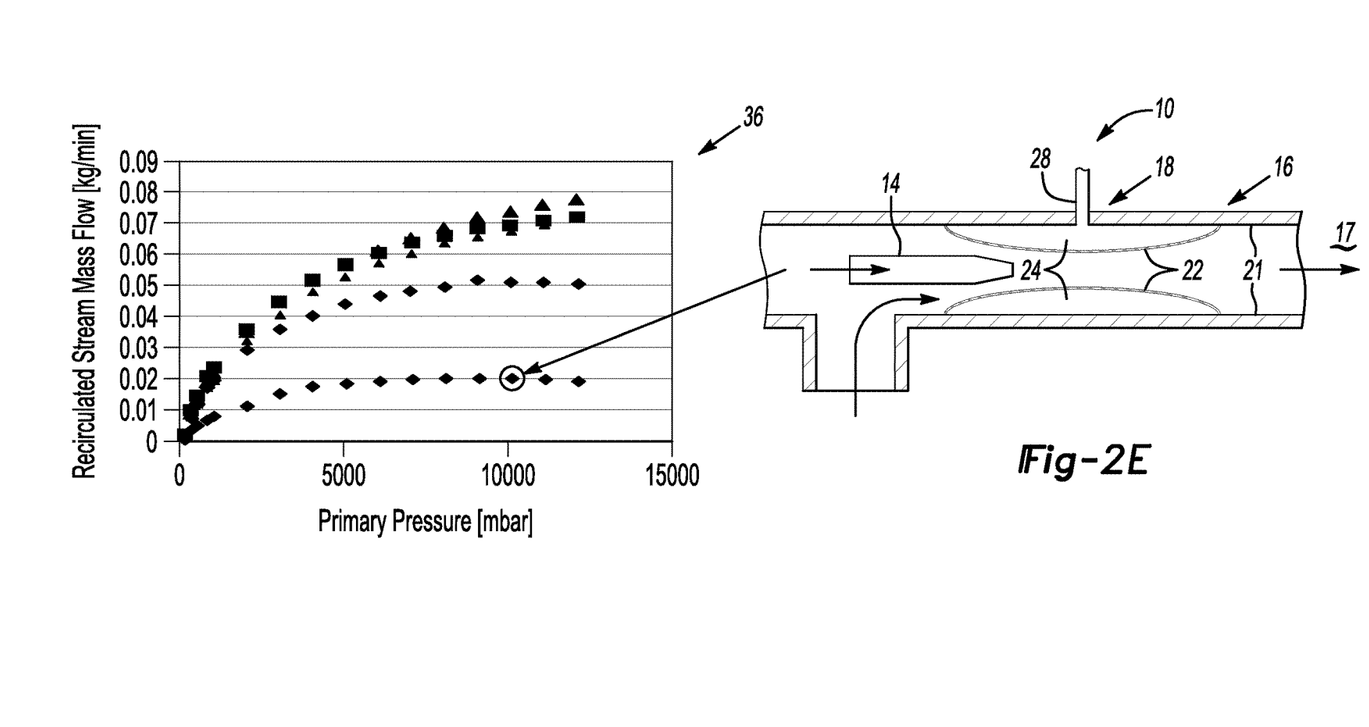

FIGS. 2B-2E generally depict the condition in which the inner diameter (or the opening) the elastic conduit 22 moves gradually moves from its maximum open state to a generally closed state. For example, FIG. 2E depicts the condition whereby the volume of the gas chamber 24 is completely full with the gas as provided from the gas supply 26 thereby causing the elastic conduit 22 to fully deflect inward to restrict the flow of the hydrogen. This condition may be indicative of the fuel cell system 12 being in the low power mode. In one example, the overall diameter (or the opening) of the elastic conduit 22 may vary up to 1 mm, where 1 mm corresponding to the maximum diameter while the fuel cell stack is in the high power mode. It is recognized that the overall diameter (or the opening) of the elastic conduit 22 may vary based on the desired criteria of a particular implementation.

Figure 3:
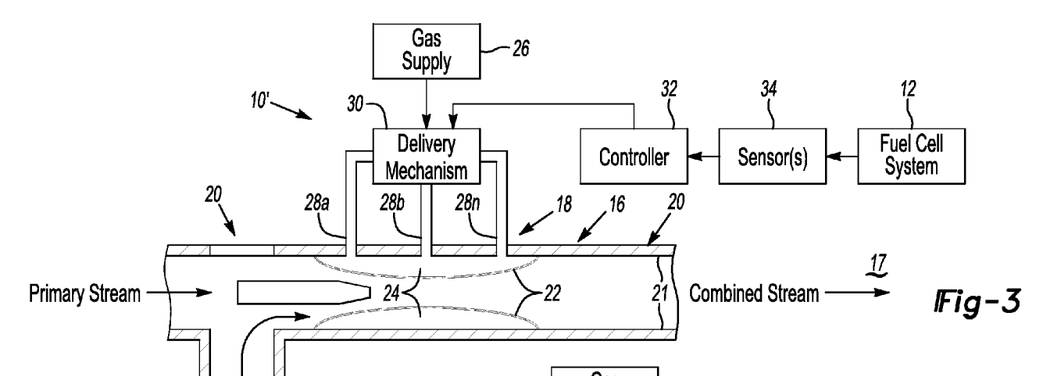
FIG. 3 depicts the apparatus in accordance to another embodiment.

FIG. 3 depicts the apparatus 10' in accordance to another embodiment. The apparatus 10' generally depicts a plurality of gas inlets 28a-28n for receiving the gas from the gas supply 26. The controller 32 may selectively control the delivery mechanism to deliver the gas to one or more of the gas inlets 28a-28n. The use of a plurality of gas inlets 28a-28n may allow for increased levels of control regarding the shape of the conduit 22. Likewise, the controller 32 may control the delivery mechanism 30 to remove the gas from the gas chamber 24 via the inlets 28a-28n. Adjusting the location of the elastic conduit 22 within the conduit 16 allows for altering the position of nozzle 14 relative to the narrowest area in the conduit which can permit the control of the composition of the combined flows by restricting the area afforded to the primary and recirculated streams as they combine.

Figure 4:
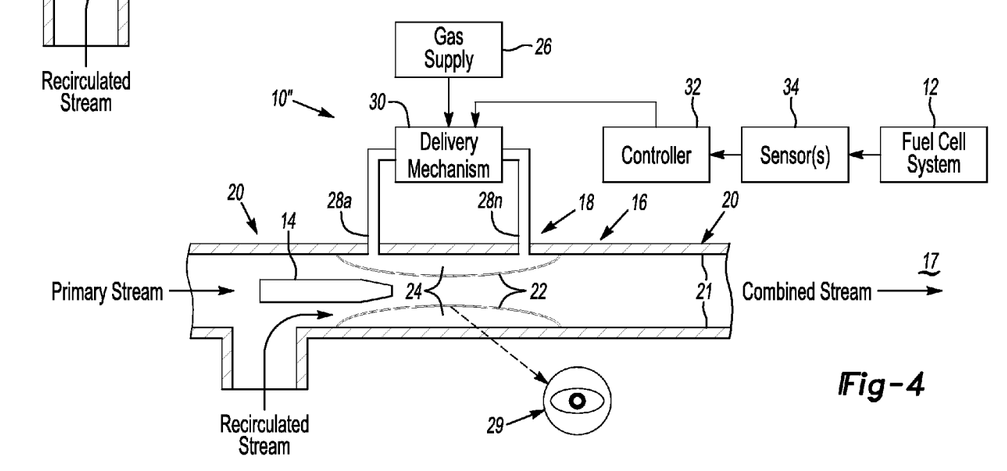
FIG. 4 depicts the apparatus in accordance to another embodiment.

FIG. 4 depicts the apparatus 10'' in accordance to another embodiment. The elastic conduit 22 comprises materials which enable the conduit 22 to change its shape as opposed to the size. This condition is generally shown at 29. For example, the view at 29 depicts a bottom view of the conduit 22 which demonstrates that the shape may change from a generally circular pattern to a generally oval pattern or vice versa. For example, in the event gas is added to the gas chamber 24, the conduit 22 may change its shape to a circular which may reduce flow of hydrogen. Conversely, in the event gas is removed from the gas chamber 24, the conduit 22 may change its shape from a circular pattern to a generally oval pattern to increase the flow of hydrogen.

Figure 5A:
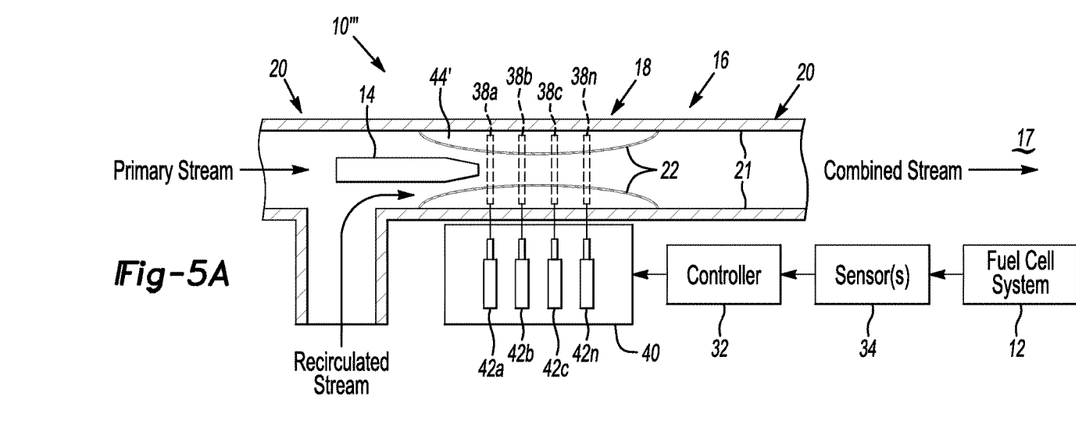
FIG. 5A depicts the apparatus in accordance to another embodiment.
Figure 5B:
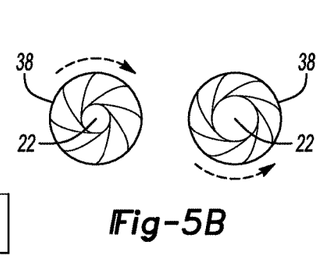
FIG. 5B depicts a side view of a shaping ring used in connection with the apparatus of FIG. 5A.

FIG. 5A depicts various views of apparatus 10''' in accordance to another embodiment. The apparatus 10''' generally includes one or more shaping rings 38a-38n ("38") that surround the elastic conduit 22. A motor assembly 40 includes a plurality of motors (e.g., servo motors) 42a-42n ("42") for controlling the shaping rings 38 to open or close thereby increasing or decreasing the diameter of the elastic conduit 22. For example, the shaping ring 38 may be positioned around the elastic conduit 22 (see FIG. 5B) and may apply a force against an exterior portion of the elastic conduit 22 to close when desired (e.g., when the fuel cell stack is in the low power mode) to restrict the flow of combined stream. The controller 32 may control the motor assembly 40 to cause the shaping rings 38 to apply the force against the exterior portion of the elastic conduit 22 based on the operating characteristics of the fuel cell system 12 (e.g., current/power generated by the fuel cell stack or temperature within the fuel cell system 12). Conversely, the controller 32 may control the motor assembly 40 to cause the shaping rings 38 to open thereby enabling the diameter of the elastic conduit 22 to increase to allow an increased flow of hydrogen from the primary stream and the recirculated stream based on the operating characteristics of the fuel cell system 12 (e.g., current/power generated by the fuel cell stack or temperature within the fuel cell system 12).

The number of shaping rings 38 used may vary based on the properties of the elastic conduit 22. The shaping rings 38 may be enclosed within the first section 18 to mitigate leakage at the rings 38. The solid wall 21 and the elastic conduit 22 generally define a ring chamber 44' for housing the shaping rings 38 and for preventing gas leakage.

Figure 6A:
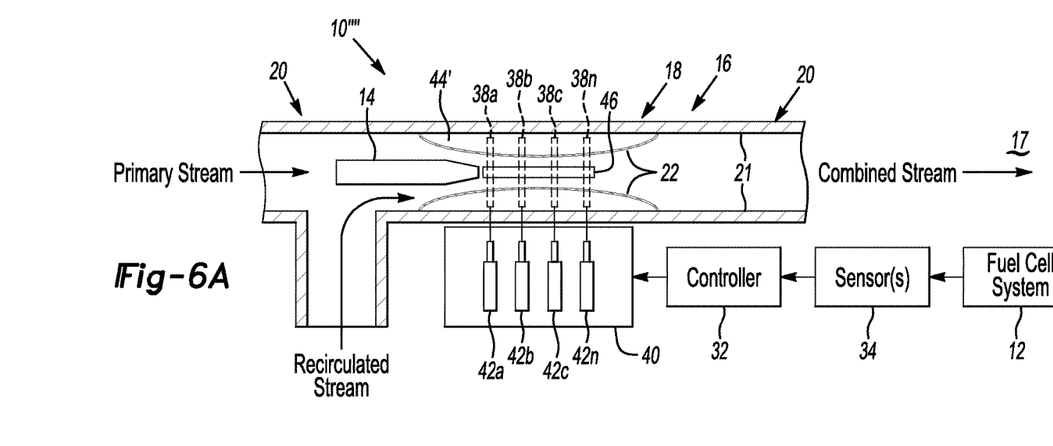
FIG. 6A depicts the apparatus in accordance to another embodiment.

FIG. 6A depicts the apparatus 10'''' in accordance to another embodiment. A centering mechanism 46 is positioned within the elastic conduit 22 for centering the shaping rings 38. The shaping rings 38 within the apparatus 10'''' (see FIG. 6B) are generally arranged as an elastic strap for applying a force against an exterior of the elastic conduit 22 to restrict the flow of the hydrogen from the primary stream and the recirculated stream. The motors 42 may each be implemented as a linear positioning stage motor that are each coupled to the shaping ring 38 (e.g., the elastic strap) for controlling the movement of the shaping ring 38.

The controller 32 may control the motor assembly 40 to cause the shaping rings 38 to apply the force against the exterior portion of the elastic conduit 22 based on the operating characteristics of the fuel cell system 12 (e.g., current/power generated by the fuel cell stack or temperature within the fuel cell system 12). Conversely, the controller 32 may control the motor assembly 40 to cause the shaping rings 38 to open thereby enabling the diameter of the elastic conduit 22 to increase to allow an increased flow of hydrogen from the primary stream and the recirculate stream based on the operating characteristics of the fuel cell system 12 (e.g., current/power generated by the fuel cell stack or temperature within the fuel cell system 12).

Figure 6B:
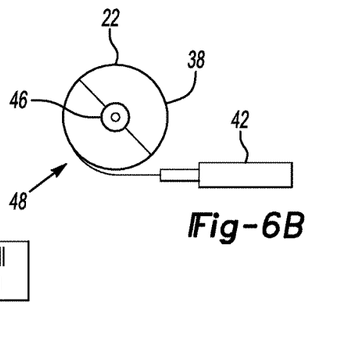
FIG. 6B depicts a side view of a shaping mechanism used in connection with the apparatus of FIG. 6A.

The centering mechanism 46 may comprise at least two opposing springs (not shown) to ensure that the elastic conduit 22 remains centered with the ejector 14 as the diameter of the elastic conduit 22 is either increased or decreased based on the operational characteristics of the fuel cell system 12. As shown in FIG. 6B, the motor 42 may pull the shaping ring 38 (or strap) at 48 to decrease the diameter of the elastic conduit 22. As the shaping ring 38 is pulled, the diameter of the elastic conduit 22 decreases, however the elastic conduit 22 may be pulled toward 48 as well. In this case, the centering mechanism 46 is provided to cause the passageway (or opening) within the elastic conduit 22 to be generally centered with the nozzle 14. It is contemplated that the number of shaping rings 38 used may vary and that each shaping ring 38 can be separately adjusted to induce different diameters or openings within the elastic conduit 22. The shaping rings 38 may be positioned in the ring chamber 44' to prevent gas leakage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for delivering a primary fuel stream to a fuel cell stack that discharges a recirculated fuel stream, the apparatus comprising:
    an ejector configured to receive the primary fuel stream from a fuel supply and to receive the recirculated fuel stream from the fuel cell stack to provide a combined fluid stream for delivery to the fuel cell stack, the ejector including an elastic conduit for varying a flow of the combined fluid stream based on a power level of the fuel cell stack,
    wherein the elastic conduit is configured to one of increase and decrease a diameter thereof based on the power level of the fuel cell stack.

2. The apparatus of claim 1 wherein the ejector includes a first inlet for receiving the primary stream.

3. The apparatus of claim 2 wherein the ejector further includes a second inlet to receive the recirculated stream, the first inlet being different from the second inlet.

4. The apparatus of claim 1 wherein the elastic conduit is further configured to increase the diameter thereof in the event the fuel cell stack is operating at a high power level.

5. The apparatus of claim 1 wherein the elastic conduit is further configured to decrease the diameter thereof in the event the fuel cell stack is operating at a low power level.

6. The apparatus of claim 1 wherein the ejector further includes a first non-varying conduit that cooperates with the elastic conduit for to define a gas chamber therebetween.

7. The apparatus of claim 6 wherein the ejector further includes at least one first inlet to receive a gas stream into the gas chamber in the event the fuel cell stack is operating at a low power level.

8. The apparatus of claim 6 wherein the ejector further includes at least one first opening to deliver the gas stream out of the gas chamber in the event the fuel cell stack is operating at a high power level.

9. The apparatus of claim 1 wherein the ejector further includes at least one shaping ring being positioned about the elastic conduit to vary a geometry thereof based on the power level of the fuel cell stack.

10. An apparatus for delivering a primary fuel stream to a fuel cell stack that discharges a recirculated fuel stream, the apparatus comprising:
    an ejector receiving the primary fuel stream and the recirculated fuel stream to provide a combined fluid stream to the fuel cell stack, the ejector including an elastic conduit that increases a diameter thereof when the stack is operating at a high power level to vary a flow of the combined fluid stream.

11. The apparatus of claim 10 wherein the elastic conduit decreases the diameter thereof when the fuel cell stack is operating at a low power level.

12. An apparatus for delivering a primary fuel stream to a fuel cell stack that discharges a recirculated fuel stream, the apparatus comprising:
    an ejector receiving the primary fuel stream and the recirculated fuel stream to provide a combined fluid stream to the stack, the ejector including an elastic conduit that decreases a diameter thereof when the stack is operating at a low power level to vary a flow of the combined fluid stream.

13. The apparatus of claim 12 wherein the elastic conduit increases the diameter thereof when the fuel cell stack is operating at a high power level.

* * * * *